(12) United States Patent        (10) Patent No.:     US 6,179,307 B1
Mao                              (45) Date of Patent:     Jan. 30, 2001

(54) SKATEBOARDING VEHICLE

(76) Inventor: Chen Shou Mao, 344, Section 1, Chung Shan Road, Tah-Cha Township, Taichung Hsien (TW)

( * ) Notice: Under 35 U.S.C. 154(b), the term of this patent shall be extended for 0 days.

(21) Appl. No.: 09/593,302

(22) Filed: Jun. 13, 2000

(51) Int. Cl.[7] .............................. B62M 1/00; B62M 1/14; B62M 3/00

(52) U.S. Cl. ................................ 280/87.041; 280/87.05; 280/244

(58) Field of Search .......................... 280/87.041, 87.05, 280/244, 246, 248

(56) References Cited

U.S. PATENT DOCUMENTS

| 1,227,888 | * | 5/1917 | Converse | 280/87.041 |
|---|---|---|---|---|
| 1,568,412 | * | 1/1926 | Parkes | 280/87.041 |
| 1,614,822 | * | 1/1927 | Bukolt | 280/87.041 |
| 1,658,068 | * | 2/1928 | White | 280/87.041 |
| 2,180,143 | * | 11/1939 | Fletcher | 280/87.041 |
| 2,319,066 | * | 5/1943 | Klatt et al. | 280/87.041 |
| 2,861,814 | * | 11/1958 | Rebhun | 280/87.041 |
| 3,052,481 | * | 9/1962 | Kaufman | 280/87.041 |
| 3,992,029 | * | 11/1976 | Washizawa et al. | 280/87.041 |
| 4,189,166 | * | 2/1980 | Lindsey | 280/247 |
| 4,394,029 | * | 7/1983 | Holmgren | 280/87.041 |
| 4,453,729 | * | 6/1984 | Lucken | 280/244 |
| 4,799,701 | * | 1/1989 | Lindau et al. | 280/87.041 |
| 4,951,958 | * | 8/1990 | Chao | 280/87.041 |
| 5,272,928 | * | 12/1993 | Young | 280/246 |
| 5,282,640 | * | 2/1994 | Lindsey | 280/244 |
| 5,308,097 | * | 5/1994 | Bono et al. | 280/246 |
| 5,328,195 | * | 7/1994 | Sommet et al. | 280/244 |
| 5,848,660 | * | 12/1998 | McGreen | 280/87.041 |
| 5,876,052 | * | 3/1999 | Olson et al. | 280/244 |
| 5,927,733 | * | 7/1999 | Banda | 280/87.041 |
| 6,079,724 | * | 6/2000 | Lin | 280/87.041 |

* cited by examiner

Primary Examiner—Brian L. Johnson
Assistant Examiner—Joselynn Sliteris
(74) Attorney, Agent, or Firm—Harrison & Egbert

(57) ABSTRACT

A skateboarding vehicle including a rear wheel and a brake shoe, which are pivoted to the rear end of a deck board. The deck board is provided at the front end with two guide plates and an arresting wheel set which is disposed between the two guide plates such that the arresting wheel set is connected to the handlebar frame by a link member.

1 Claim, 6 Drawing Sheets

SKATEBOARDING VEHICLE

BACKGROUND OF THE INVENTION

1. Field of the Invention

The present invention relates generally to a skateboarding vehicle, and more particularly to a braking structure of the skateboarding vehicle.

2. Description of Related Art

As shown in FIG. 1, a skateboarding vehicle 10 of the prior art comprises mainly a skateboard 11, a handlebar 12, and two wheels. The skateboarding vehicle 10 is rather simple in construction in that it is devoid of a braking structure to stop the skateboarding vehicle 10.

BRIEF SUMMARY OF THE INVENTION

The primary objective of the present invention is to provide a skateboarding vehicle with a braking structure which is designed to stop the skateboarding vehicle in motion.

The features of the present invention will be readily understood upon a thoughtful deliberation of the following detailed description of a preferred embodiment of the present invention with reference to the accompanying drawings.

DETAILED DESCRIPTION OF THE INVENTION

Figure 1:
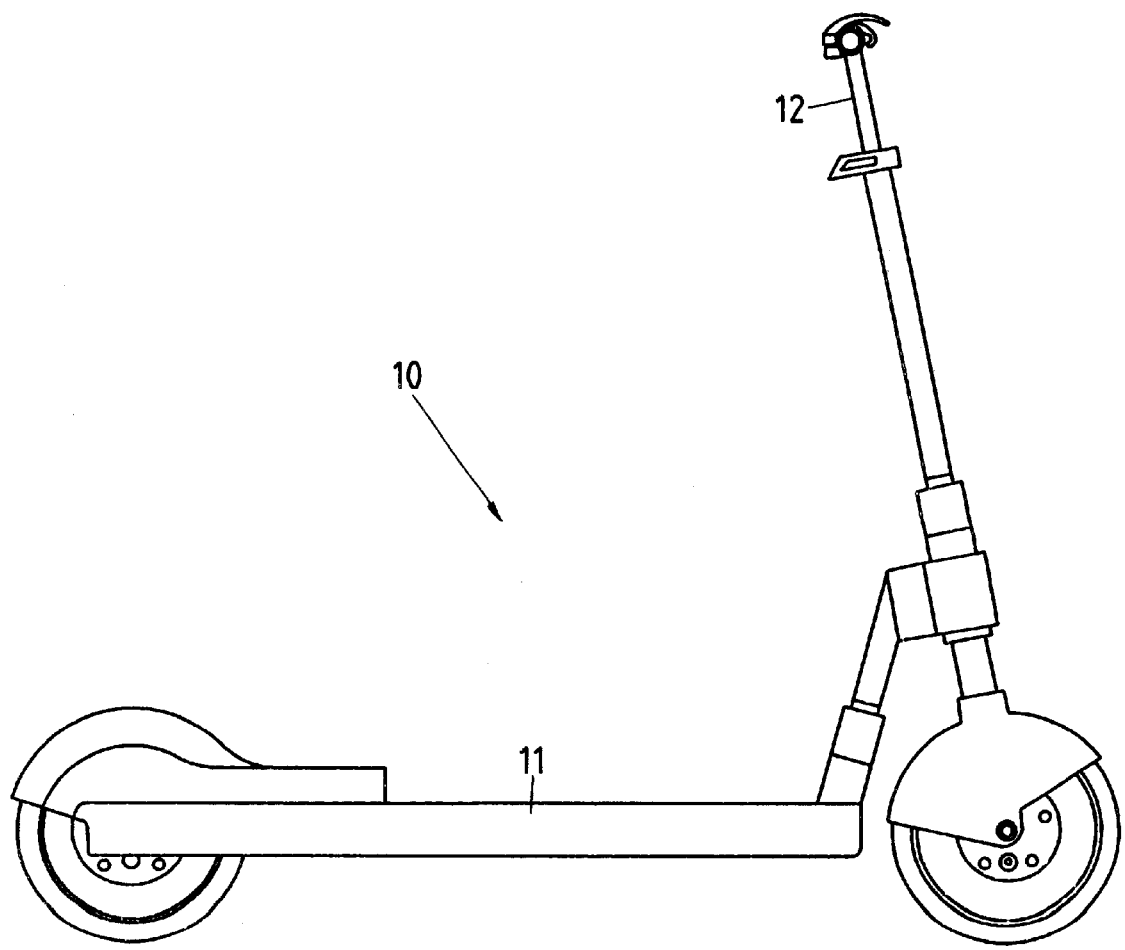
FIG. 1 shows a side view of a skateboarding vehicle of the prior art.
Figure 2:
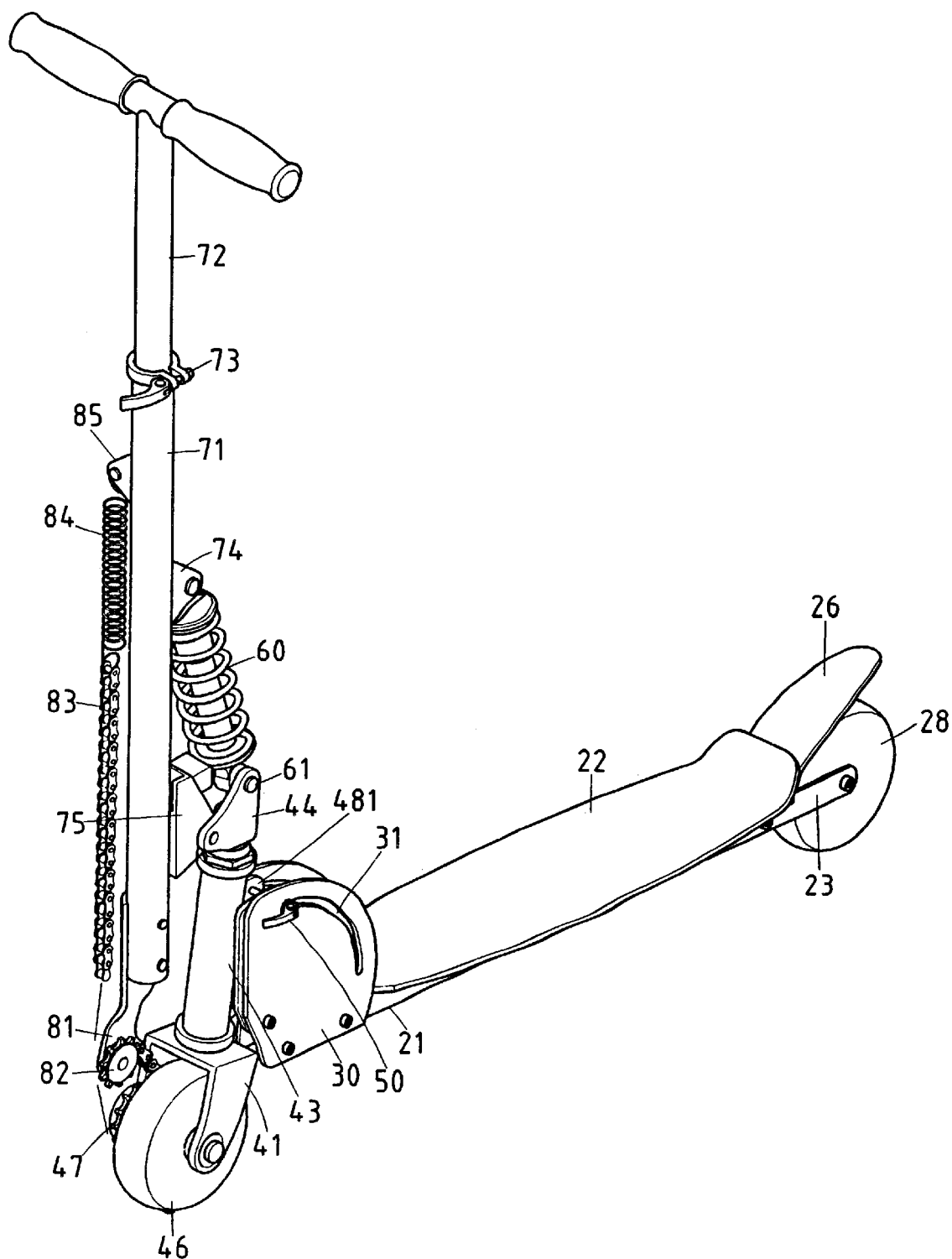
FIG. 2 shows a perspective view of a skateboarding vehicle of the preferred embodiment of the present invention.
Figure 3:
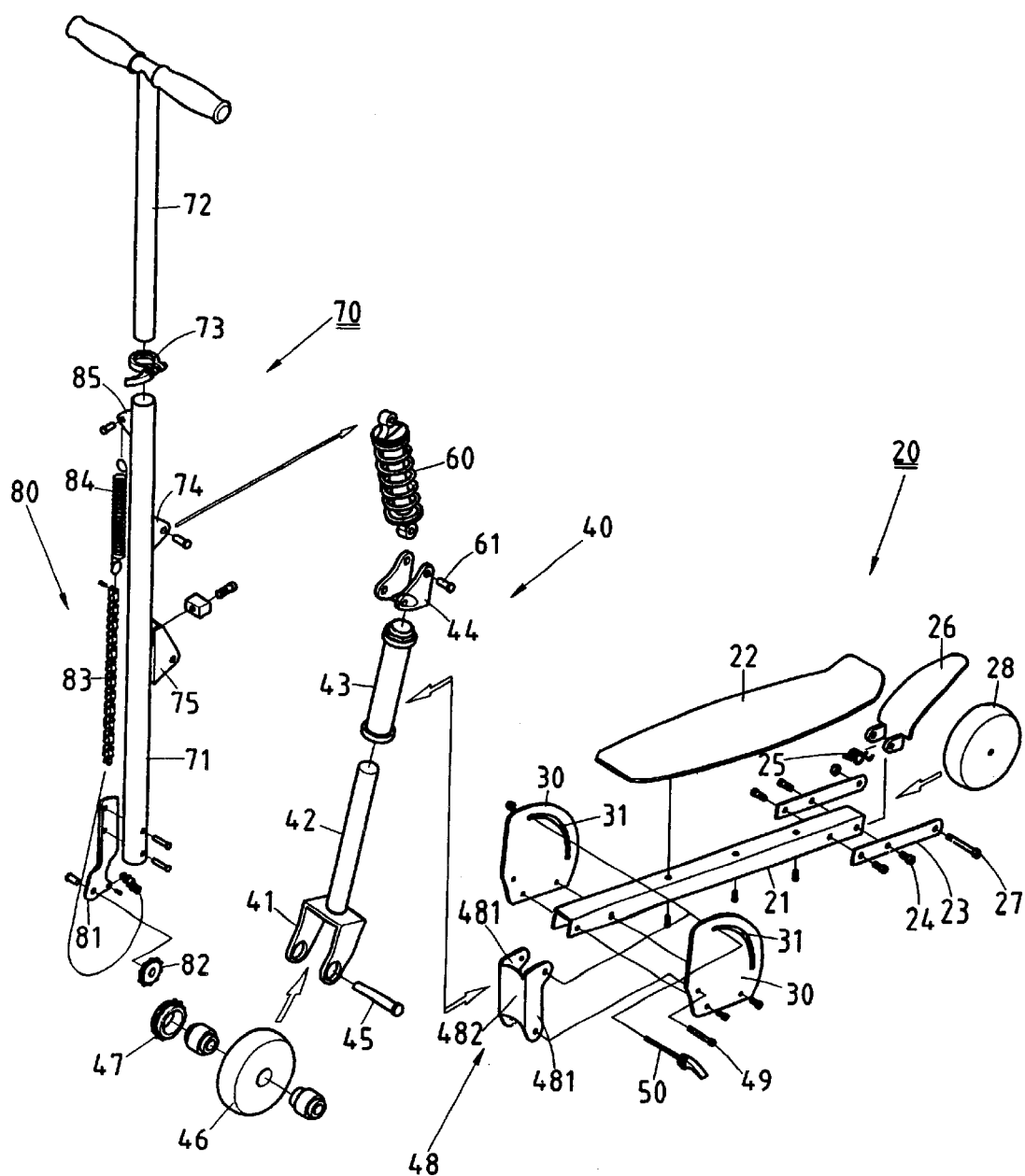
FIG. 3 shows an exploded view of the skateboarding vehicle of the preferred embodiment of the present invention.
Figure 4:
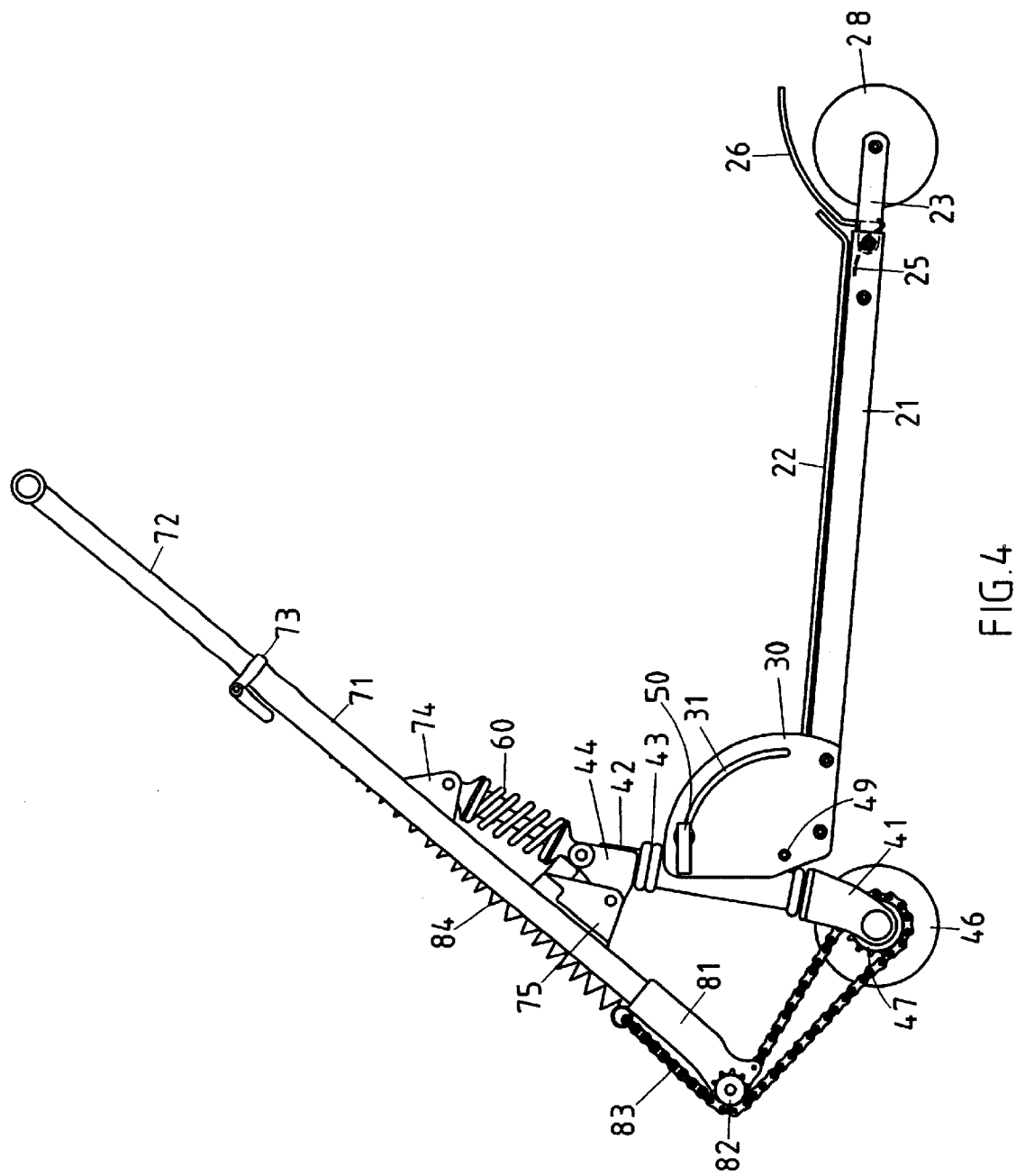
FIG. 4 shows a side schematic view of the skateboarding vehicle of the preferred embodiment of the present invention.
Figure 5:
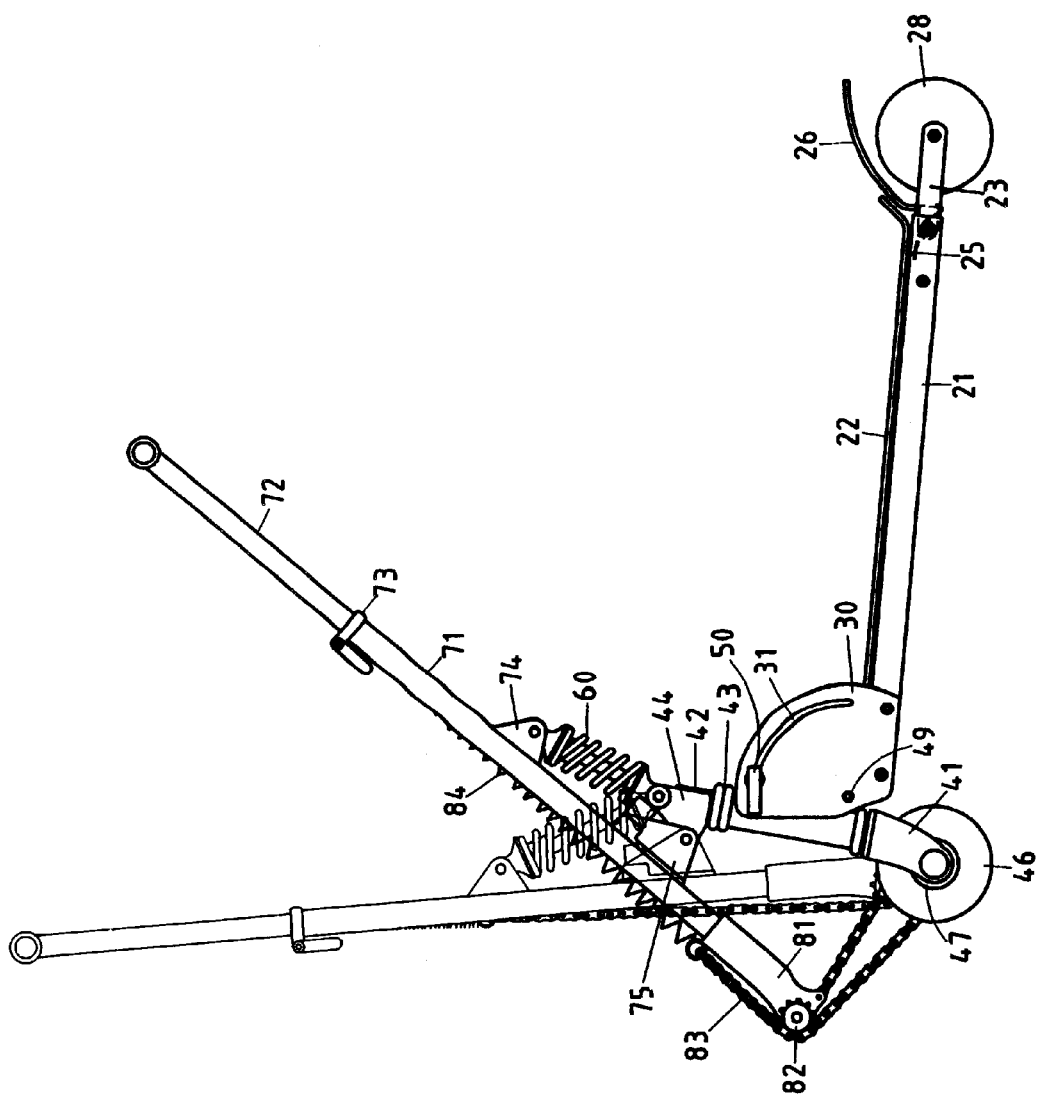
FIG. 5 shows a schematic view of the skateboarding vehicle of the preferred embodiment of the present invention in action.
Figure 6:
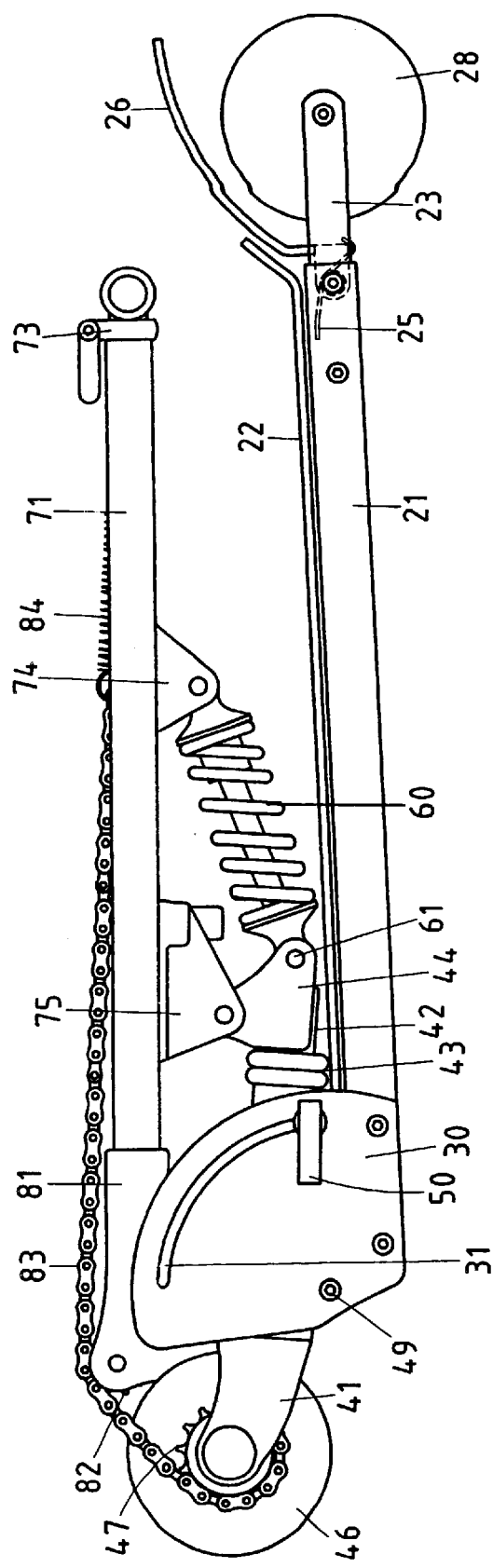
FIG. 6 shows a schematic view of the skateboarding vehicle of the preferred embodiment of the present invention in the folded state.

As shown in FIGS. 2–6, a skateboarding vehicle embodied in the present invention comprises the component parts, which are described explicitly hereinafter.

A deck board 20 is provided with a rod base 21, a deck 22, two long plates 23, a cantilever spring 25, a brake shoe 26, and a rear wheel 28. The rod base 21 is fastened to the deck 22 by means of a plurality of screws. The rod base 21 is fastened at the rear end thereof to the two long plates 23 by a plurality of screws such that the long plates 23 extend beyond the rear end of the rod base 21, and that the long plates 23 are fastened to the cantilever spring 25 and the brake shoe 26 by a fastening bolt 24, and the rear wheel 28 by a bolt 27. The underside of the brake shoe 26 is opposite in location to the top edge of the rear wheel 28. The brake shoe 26 is presses by one end of the cantilever spring 25.

Two guide plates 30 are fastened to the front end of the rod base 21 by a plurality of screws and are provided with an arcuate guide hole 31.

An arresting wheel set 40 is formed of a wheel frame 41, a link seat 44, a front wheel 46, a one-way gear 47, and a locating seat 48. The wheel frame 41 has a stem 42 which is fitted into a head bowl 43 such that the top end of the stem 42 juts out of the top end of the head bowl 43. The link seat 44 is fastened to the top end of the stem 42. The wheel frame 41 is provided with a shaft 45 for pivoting the front wheel 46 and the one-way gear 47. The locating seat 48 is disposed between the two guide plates 30 and is formed of two longitudinal seat plates 481 and a plate body 482 connecting the two longitudinal seat plates 481 which are pivoted with the two guide plates 30 by a pivot 49. The stem 42 and the head bowl 43 are confined by the plate body 482 and a fast rod 50 which is received in the arcuate guide holes 31 of the two guide plates 30 and the locating seat 48. The head bowl 43 is fused with the plate body 482 of the locating seat 48 by soldering.

A pressure cylinder 60 is pivoted with the link seat 44 by a pivot 61.

A handlebar frame 70 is formed of an outer tube 71 and a handle rod 72 fitted into the outer tube 71. The outer tube 71 and the handle rod 72 are secured by a fast ring 73. The outer tube 71 is provided with an upper seat 74 and a lower seat 75. The upper seat 74 is pivoted with the pressure cylinder 60, whereas the lower seat 75 is pivoted with the link seat 44.

A link member 80 is formed of a frame body 81, a gear 82, a chain 83, and a spring 84. The frame body 81 is fastened to the outer tube 71 of the handlebar frame 70. The gear 82 is disposed over the one-way gear 47 of the front wheel 46. The chain 83 is fastened at one end thereof to the frame body 81 such that the chain 83 is engaged with the gear 82 and the one-way gear 47, and that the chain 83 is fastened at other end thereof to a locating piece 85 of the outer tube 71.

In operation, a user stands on the deck board 20 such that both hands of the user hold the handle rod 72, and that the body of the user moves forward in a reciprocating manner so as to cause the outer tube 71 to actuate the chain 83, thereby causing the chain 83 to drive the gear 82 and the one-way gear 47 to turn. The front wheel 46 is driven by the one-way gear 47 to move the skateboarding vehicle forward.

The handle rod 72 can be adjusted in height, thanks to the fast ring 73 which can be quickly removed. The handlebar frame 70 can be quickly loosened by the fast rod 50 so as to enable the locating seat 48 to be turned between the two guide plates 30. The handlebar frame 70 can be thus adjusted in the operating angle.

When the handlebar frame 70 is in action, the pressure cylinder 60 is linked to provide a damping effect. The present invention can be thus used as an exercise device.

The skateboarding vehicle of the present invention can be folded by loosening the fast rod 50 so as to enable the handlebar frame 70 to be folded to join with the deck board 20.

The skateboarding vehicle of the present invention in motion can be slowed down or stopped by pressing the brake shoe 26 against the rear wheel 28.

I claim:

1. A skateboarding vehicle comprising:

a deck board provided with a rod base, a deck, two plates, a cantilever spring, a brake shoe, and a rear wheel, said rod base being fastened to said deck and said plates whereby said plates are in turn fastened to said cantilever spring, said brake shoe, and said rear wheel opposite in location to said brake shoe which is pressed by an end of said cantilever spring;

two guide plates fastened to a front end of said rod base and provided with a guide hole of an arcuate construction;

an arresting wheel set comprising a wheel frame, a link seat, a front wheel, a one-way gear, and a locating seat, said wheel frame having a stem which is fitted into a head bowl such that a top end of said stem juts out of a top end of said head bowl, said link seat being fastened to the top end of said stem, said wheel frame provided with a shaft for mounting pivotally said front wheel and said one-way gear, said locating seat being disposed between said two guide plates and being formed of two longitudinal seat plates and a plate body connecting said two longitudinal seat plates which are pivoted with said two guide plates whereby said stem and said head bowl are confined by said plate body and said fast rod which is received in said guide holes of said guide plates and said locating seat;

a pressure cylinder pivoted with said link seat;

a handlebar frame comprising an outer tube and a handle rod fitted into said outer tube such that said handle rod and said outer tube are secured in place by a fast ring, said outer tube being provided with an upper seat and a lower seat, said upper seat being pivoted with said pressure cylinder, said lower seat being pivoted with said link seat; and a link member comprising a frame body, a gear, a chain, and a spring , said frame body being fastened to said outer tube of said handlebar frame, said gear being disposed over said one-way gear of said front wheel, said chain being fastened at one end to said frame body such that said chain is engaged with said gear and said one-way gear, and that said chain is fastened at another end to a locating piece of said outer tube.

* * * * *